United States Patent
Nagy et al.

(10) Patent No.: US 9,377,137 B2
(45) Date of Patent: Jun. 28, 2016

(54) BONDED HIGH-PRESSURE RUBBER HOSE, PARTICULARLY FOR CONVEYING GASEOUS MEDIA

(71) Applicant: ContiTech Rubber Industrial Gumiipari Kft., Szeged (HU)

(72) Inventors: Tibor Nagy, Budapest (HU); Imre Domonkos, Szeged (HU); Tamas Katona, Algyo (HU); Jeno Kotai, Szeged (HU); Gyula Beteri, Erd (HU)

(73) Assignee: ContiTech Rubber Industrial Gumiipari Kft. (HU)

( * ) Notice: Subject to any disclaimer, the term of this patent is extended or adjusted under 35 U.S.C. 154(b) by 73 days.

(21) Appl. No.: 14/352,270

(22) PCT Filed: Oct. 10, 2012

(86) PCT No.: PCT/HU2012/000103
§ 371 (c)(1),
(2) Date: Apr. 16, 2014

(87) PCT Pub. No.: WO2013/057525
PCT Pub. Date: Apr. 25, 2013

(65) Prior Publication Data
US 2014/0261845 A1    Sep. 18, 2014

(30) Foreign Application Priority Data
Oct. 18, 2011    (HU) .................................. P 1100580

(51) Int. Cl.
*F16L 11/00* (2006.01)
*F16L 11/08* (2006.01)
*F16L 33/01* (2006.01)

(52) U.S. Cl.
CPC ............... *F16L 11/08* (2013.01); *F16L 11/083* (2013.01); *F16L 33/01* (2013.01)

(58) Field of Classification Search
USPC .......................... 138/109, 125, 126, 130, 135
See application file for complete search history.

(56) References Cited

U.S. PATENT DOCUMENTS

| 3,729,028 A | 4/1973 | Horvath et al. |
| 3,866,633 A * | 2/1975 | Taylor .................. F16L 11/083 138/130 |

(Continued)

FOREIGN PATENT DOCUMENTS

| EP | 1047898 A1 | 11/2000 |
| FR | 2464423 A1 | 3/1981 |

(Continued)

OTHER PUBLICATIONS

Authorized Officer: Van Der Leeden, L, "Priority Application No.: International Preliminary Report on Patentability", Feb. 7, 2014, Publisher: PCT, Published in: EP.

(Continued)

*Primary Examiner* — James Hook
(74) *Attorney, Agent, or Firm* — Kaplan Breyer Schwarz & Ottesen LLP (57) ABSTRACT

The invention relates to a bonded high-pressure rubber hose comprising a flexible internal stripwound tube (10), a liquid and gas tight liner (2) made from rubber or plastic, reinforcing plies embedded in rubber, and in specific cases an adhesively bonded coupling body (11), the lower reinforcing ply or plies being disposed at an angle smaller than the so-called angle of equilibrium (35.26°). The invention is characterized by that in addition to the primary liner the hose (2) comprises a liquid and gas tight secondary liner (7) disposed above the small angle reinforcing ply or plies (1,1a), and that the following inequality holds for the angle of lay of the lowest reinforcing ply (1) of the hose: •where •$a_1$ is the angle of lay of the lowest small angle reinforcing ply (1) •D s is the outside diameter of the internal stripwound tube (10) •$D_1$ is the mean diameter of the lowest small angle reinforcing ply (1).

10 Claims, 4 Drawing Sheets

(56) References Cited

U.S. PATENT DOCUMENTS

| | | | |
|---|---|---|---|
| 4,402,346 A | 9/1983 | Cheetham et al. | |
| 4,403,631 A * | 9/1983 | Abdullaev | F16L 11/16 138/130 |
| 4,549,581 A * | 10/1985 | Unno | B29C 53/583 138/109 |
| 4,567,916 A | 2/1986 | Antal et al. | |
| 4,693,281 A * | 9/1987 | Creedon | F16L 11/083 138/130 |
| 4,867,205 A * | 9/1989 | Bournazel | F16L 11/083 138/130 |
| 5,024,252 A * | 6/1991 | Ochsner | F16L 11/083 138/129 |
| 5,176,179 A * | 1/1993 | Bournazel | F16L 11/112 138/130 |
| 5,275,209 A | 1/1994 | Sugier et al. | |
| 6,039,083 A * | 3/2000 | Loper | F16L 11/083 138/107 |
| 6,360,781 B1 * | 3/2002 | Braad | F16L 33/01 138/109 |
| 7,143,789 B2 | 12/2006 | Nagy et al. | |
| 2004/0089360 A1 * | 5/2004 | Foti | F16L 33/26 138/109 |

FOREIGN PATENT DOCUMENTS

| | | |
|---|---|---|
| GB | 2167521 A | 5/1986 |
| GB | 2205625 A | 12/1988 |
| GB | 2329439 A | 3/1999 |
| WO | 2006005689 A1 | 1/2006 |

OTHER PUBLICATIONS

Authorized Officer: Ralf Balzer, Priority Application No. PCT/HU2012/000103 "International Search Report", Aug. 14, 2013, Publisher: PCT, Published in: WO.

* cited by examiner

BONDED HIGH-PRESSURE RUBBER HOSE, PARTICULARLY FOR CONVEYING GASEOUS MEDIA

The invention relates to a bonded high-pressure rubber hose, particularly for conveying gaseous media, comprising a flexible internal stripwound tube, a liquid and gas tight liner made from rubber or plastic, reinforcing plies embedded in rubber, and in specific cases an adhesively bonded coupling body, the lower reinforcing ply or plies being disposed at an angle smaller than the so-called angle of equilibrium (35.26°). In the context of the present specification, the phrase "high pressure" refers to operating pressures of 1.5 MPa or higher. Also, for the aspects of the present invention a hose is regarded a "bonded hose" in case the main reinforcing plies thereof are embedded in rubber. These hoses may in specific cases also comprise partially bonded or unbonded layers.

Figure 1:
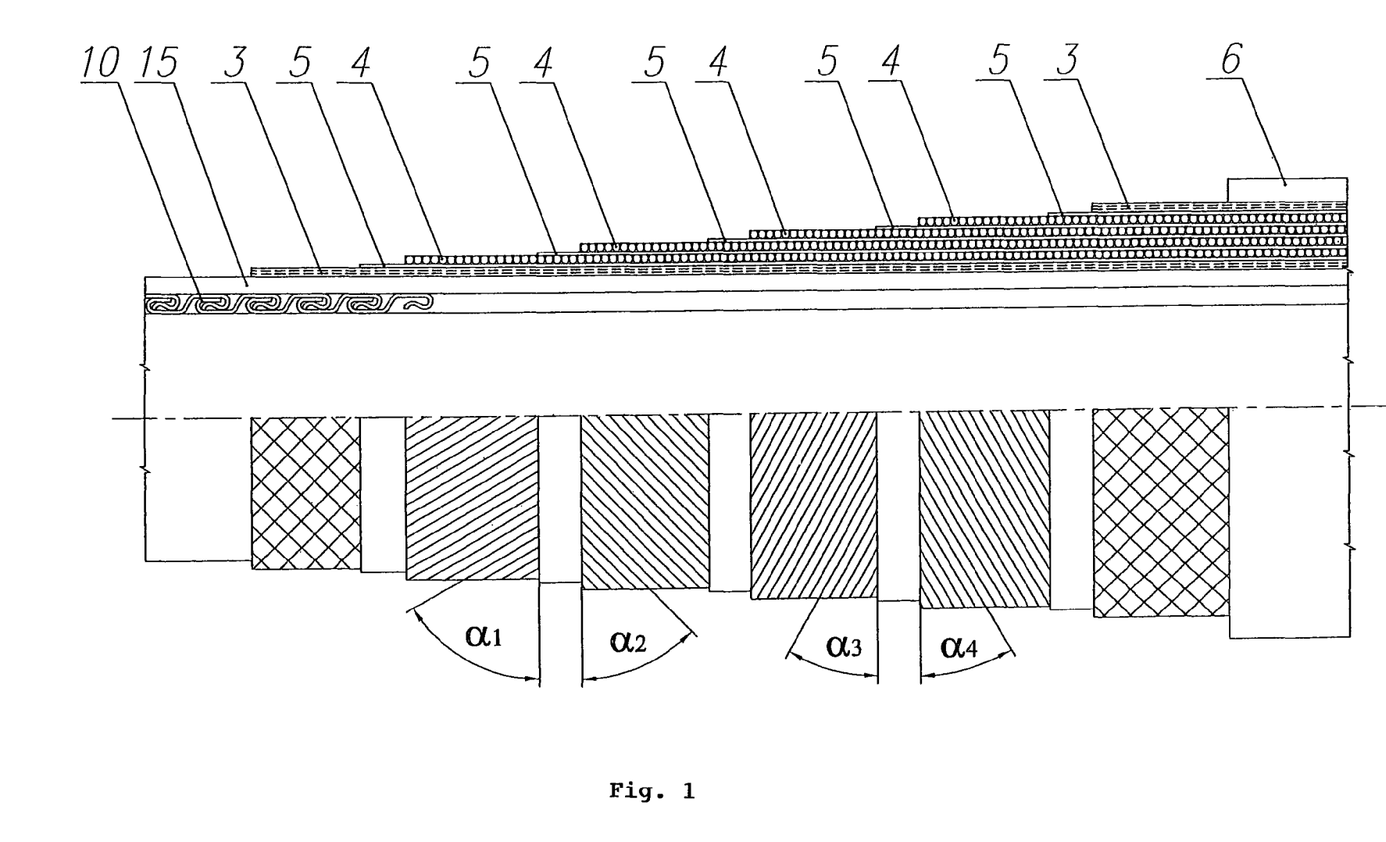
FIG. 1 shows a typical conventional bonded hose design adapted to convey high-pressure gas that has been described in detail in the introductory section of the present specification.

As it is known from the state of the art, high-pressure hoses are widely applied for conveying gaseous media. Among others, petroleum industry recommended practice API RP 17B 4th. Ed. and the corresponding standard ISO 13628-11, as well as specification API Spec. 17K 2nd Ed and the corresponding standard ISO 13628-10 are related to bonded (rubber) hoses or flexible pipes. The conventional configuration of such hoses is presented in FIG. 1. Bonded hoses usually contain the following major structural components (as shown in FIG. 1):

- an internal stripwound tube 10, also known as carcass, which is usually made from stainless steel, there being usually no adhesion between the internal stripwound tube and the layer located above it. (The term "above" is used here in the sense that the layer in question radially encompasses the layer located below it.)
- a liner 2 constituting the liquid and gas tight layer of the hose, may be made from rubber or from plastic, and is usually (but not in all cases) in vulcanised adhesion to the layer located above it.
- rubberized textile plies 3, which are usually in vulcanised adhesion to the layers disposed below and above them. The textile material may be fabric or cord fabric made from natural or synthetic fibres.
- reinforcing plies 4, constituting the main load bearing components, their material being steel wire, cable, or high-strength textile fibres, having a coating that provides adhesion between the reinforcing fibre and the embedding rubber layer 5. The reinforcing plies are usually laid in a helical fashion, but they may also be braided (particularly in case of smaller diameters). In case helically laid reinforcing plies are applied, the number of plies is at least 2 but may be much higher (even 6 to 8). In case of circular woven plies the number of plies is 1 or more.
- embedding rubber layers 5 made from rubber or rubberized textile that provides adhesion between the reinforcing ply 4 and the embedding rubber layer 5 after vulcanisation.
- a cover 6 constituting the outer polymer layer of the hose, usually made from rubber but may also be plastic, with a rubberized textile layer being often located below it.

In addition to these components high-pressure hoses may comprise a number of further elements such as a steel or composite helix, an outer stripwound armouring, etc. Since these additional components are well known to those skilled in the art, they are not explained in further detail here.

For transporting high-pressure gas containing media it is of key importance that in the event of rapid decompression, damage to the hose structure, and especially to the liner, appearing in the form of delamination, blistering, or burst caused by the gas dissolved into the hose material could be prevented.

The prior art contains several patent specifications that disclose hoses particularly adapted to convey gaseous media. The document U.S. Pat. No. 4,567,916, for instance, describes a solution applying a layer for venting the permeated gas from the hose to the environment. The gas venting layer of the hose is obviously located above the liner, and therefore does not prevent the buildup of gas pressure inside it. Patent specification GB 4,402,346 discloses a solution that applies a double helix shaped layer as an internal burst-proof layer, encompassed by a gas and liquid tight liner. Buildup of gas pressure above the liner is restrained by including a cover having higher gas permeability than the liner. The document GB 2,167,521A discloses a hose for conveying gas-containing crude oil, wherein a liner made from flexible material is supported by a radially inner stripwound tube, the material of the liner filling the helical crevice defined by the outer surface of the inner stripwound tube. When exposed to crude oil the liner swells by at least 10%, which according to the inventors is supposed to protect the hose from damage caused by rapid decompression. The hose also contains a reinforcing ply made from steel wire, under which a rubberized textile ply is disposed in a conventional manner. Patent specification EP 1,047,898 B1 discloses a hose comprising a liner made from a fluoropolymer, material that is regarded less sensitive to decompression than rubber, while the document GB 2,329,439 A discloses a hose having a liner made from semi-crystalline plastic. It should be noted here that the solution according to the document EP 1,047,898 has not become widely applied in industrial practice.

Based on the above it can be established that the cited solutions do not provide sufficient protection to the liner, and therefore they do not offer reliable protection of the hose in the event of rapid decompression.

According to the state of the art high pressure hoses having helically wound reinforcing plies the angle of lay of the main reinforcing plies usually decreases radially outward from the centre line of the hose. (The angle of lay is measured between a circular crosssection taken perpendicularly to the hose axis, see FIG. 1) Such a configuration is disclosed for instance in patent specifications U.S. Pat. No. 3,729,028 and GB 2 205 625 A, and in examples 1, 4, 5, and 6 of patent specification U.S. Pat. No. 7,143,789 B2.

Such hoses undergo a small extent of longitudinal shrinkage under internal pressure while expanding in a radial direction, giving room for delamination of the liner in the event of rapid decompression. Thereby the applicable gas pressure is limited. Some plastic materials having much higher elastic modulus than rubber better withstand gas decompression than elastomer materials, but at the same time they are relatively rigid, are sensitive to crack propagation and therefore may burst longitudinally when utilized in a radially expanding hose. Conventional bonded or unbonded hose designs adapted for conveying high-pressure gases have the common disadvantage of losing gas and liquid tight sealing in case of liner damage, which causes leakage in case of bonded hoses and a sudden discharge of a high quantity of fluid in case of unbonded hoses.

Although the document U.S. Pat. No. 7,143,789 B2, referenced above, discloses among others a preferred embodiment (Example 3) wherein the lowest reinforcing ply of the hose is laid at a small angle of lay, the aim of the invention was to provide a hose that will not undergo significant longitudinal deformation and twist in operation although it has an odd (instead of even) number of helical reinforcing plies. The aim of the invention specified in U.S. Pat. No. 7,143,789 B2 is therefore completely different from the aim set before the present invention. Gas proofness was not included among the requirements for U.S. Pat. No. 7,143,789 B2, and thus the application of an internal stripwound tube is not mentioned therein.

Braided reinforcing plies are usually laid at the so-called angle of Equilibrium (35.26°), or at an angle near that, which in itself does not prevent the hose from shrinking in the event of rapid decompression that would result in liner blistering. In industrial practice holes are pinpricked in the cover of such hoses down to the reinforcement to prevent the buildup of gas pressure under the cover. This, however, enables moisture to enter the hose which results in corrosion of the reinforcement.

The objective of the present invention is to provide a hose structure suitable for conveying high pressure gas that is less sensitive to rapid gas decompression than existing solutions. The hoses configured according to the present invention also display minimum radial deformation, providing that longitudinal bursts of the liner will not occur even if liners made from thermoplastics are applied. Furthermore, hoses according to the present invention do not lose water and gas tightness even if their liner is damaged. At the same time, they retain their flexibility that is characteristic of bonded hoses. In addition to having minimal radial deformation, they also have minimal axial deformation under internal pressure, and withstand axial-direction external forces better than conventional bonded hoses.

The hose according to the present invention comprises components that are known from the state of the art of high-pressure hoses adapted for conveying gas-containing media, but it also includes novel components. Internal support of the hose is provided by a stripwound tube known per se. A liner (in the following: primary liner), and optionally a rubberized textile ply or plies are disposed above the stripwound tube. Going radially outward the next components are the lowest, small angle reinforcing ply or plies that are encompassed by embedding rubber layers. We have recognised that to fulfil the objective of the present invention it is necessary to include a novel component, namely a secondary liner, above (radially outside) the small angle reinforcing ply or plies. The angle of lay of the upper reinforcing plies encompassed by embedding rubber layers is higher than the so-called angle of equilibrium (35.26°). The hose is capped by a rubber cover that may optionally comprise a rubberized textile ply or plies.

The invention is further based on the recognition that in case rapid decompression occurs in a gas-filled hose the gas diffused into the primary liner and into the rubberized textile plies causes hydrostatic pressure buildup between the stripwound tube and the reinforcing plies. At the same time, hydrostatic pressure obviously disappears from inside of the stripwound tube, changing the delicate equilibrium between radial and tangential forces which is crucial for the design of conventional hoses. Axial forces resulting from hydrostatic pressure fall below the value that would be necessary to balance the tangential forces caused by the pressure between the stripwound tube and the reinforcing ply. Hoses of conventional configuration will therefore undergo axial shrinkage and radial expansion in case of rapid decompression, which is confirmed by our observations. The distance between the stripwound tube and the reinforcing ply thereby increases, giving room for liner delamination. Based on calculations not detailed here we have recognised that if inequality (1) below holds for the angle of lay $\alpha_1$ of the lowest (innermost) reinforcing ply, then the hose will not undergo axial shrinkage and radial expansion in the event of decompression.

$$tg^2\alpha_1 < [1-(D_s/D_1)^2]/2 \qquad (1)$$

where:
$\alpha_1$ is the angle of lay of the lowest small angle reinforcing ply (1)
$D_s$ is the outside diameter of the internal stripwound tube (10)
$D_1$ is the mean diameter of the lowest small angle reinforcing ply (1).

In a preferred embodiment of the present invention more than one lower small angle reinforcing plies are disposed above the primary liner and the optionally included load distributing textile plies. The terms lowest/lower small angle reinforcing ply are used to refer to plies that have an angle of lay below the angle of equilibrium, and are disposed closer to the axis of rotation of the hose than the upper reinforcing plies laid at angles exceeding the angle of equilibrium. Each pair of the lower small angle reinforcing plies may be laid in alternating or identical senses. If necessary, more than two lower small angle reinforcing plies may be applied, their number being either even or odd (3, 4, 5, 6, etc.) without any limitation. It is expedient if the angle of lay of each lower small angle reinforcing ply satisfies the following inequality (2) analogous to (1):

$$tg^2\alpha_i < [1-(D_s/D_i)^2]/2 \qquad (2)$$

where:
$\alpha_i$ is the angle of lay of the i-th small angle reinforcing ply
$D_s$ is the outside diameter of the internal stripwound tube 10
$D_i$ is the mean diameter of the i-th small angle reinforcing ply We have also recognised that the resistance against rapid gas decompression depends to a high extent on how the distance between the stripwound tube and the lowest small angle reinforcing ply is changing under operating pressure. In our view the decisive factor is the relative, rather than the absolute value of the change: $100 \cdot (D_{1P}-D_s)/(D_1-D_s)$, where references are identical to those used above, and $D_{1P}$ is the mean diameter of the lowest small angle reinforcing ply under operating pressure P. Thus, in case the above expression yields a value of 10, then the relative radial expansion of the outside diameter of the stripwound tube and the mean diameter of the lowest small angle reinforcing ply is 10%.

Since the greatest part of tangential forces are borne by the lowest small angle reinforcing ply, we have set up a criterion for the elastic deformation thereof. We will return below to the case where in a conceivable embodiment of the invention more than one lower small angle reinforcing plies are present.

The reinforcing ply filaments should expediently have a high modulus of elasticity so that their radial deformation due to internal pressure can be kept low, and thereby they do not leave much space for the blistering and delamination of the liner. The filaments may be characterised by the force $F_i$ necessary for them to undergo an elastic strain of 0.1%. According to our calculations not detailed here for a hose comprising a single lower small angle reinforcing ply the small angle reinforcing ply satisfies the following inequality:

$$(PD_1^3 \Pi \, tg\alpha_1)/[20 n_1 F_1(D_1-D_s)] < 25 \qquad (3)$$

In essence this means that in case the entire amount of tangential force was borne by the lowest small angle reinforcing ply under operating pressure, the increase of the distance between the stripwound tube and the lowest small angle reinforcing ply would not exceed 25%.

The hose according to the present invention preferably satisfies the following inequality:

$$(PD_1^3 \Pi \, tg\alpha_1)/[20 n_1 F_1(D_1-D_s)] < 10 \qquad (4)$$

In essence this means that in case the entire amount of tangential force was borne by the lowest small angle reinforcing ply under operating pressure, the increase of the distance between the stripwound tube and the lowest small angle reinforcing ply would not exceed 10%.

The hose according to the present invention most preferably satisfies the following inequality:

$$(PD_1^3 \prod tg\alpha_1)/[20n_1F_1(D_1-D_s)]<5 \quad (5)$$

In essence this means that in case the entire amount of tangential force was borne by the lowest small angle reinforcing ply under operating pressure, the increase of the distance between the stripwound tube and the lowest small angle reinforcing ply would not exceed 5%.

where in the above formulas

P is the design operating pressure of the hose $n_1$ is the number of filaments of the lowest small angle reinforcing ply $F_1$ is the force required for an elastic strain of 0.1% in case of a single reinforcing ply filament, other references being the same as specified above.

In an analogous manner, for a hose comprising more than one lower small angle reinforcing plies the lower small angle reinforcing plies collectively satisfy the following inequality:

$$[P\Sigma(D_i^3 \prod tg\alpha_i)]/\Sigma[20n_iF_i(D_i-D_s)]<25 \quad (6)$$

preferably $$[P\Sigma(D_i^3 \prod tg\alpha_i)]/\Sigma[20n_iF_i(D_i-D_s)]<10 \quad (7)$$

most preferably $$[P\Sigma(D_i^3 \prod tg\alpha_i)]/\Sigma[20n_iF_i(D_i-D_s)]<5 \quad (8)$$

where $n_i$ is the number of filaments of the i-th lowest small angle reinforcing ply $F_i$ is the force required for an elastic strain of 0.1% in case of a single reinforcing ply filament in the i-th ply, all the other references being the same as specified above.

In the hose according to the invention a secondary liner is disposed between the lower small angle reinforcing ply or plies and the higher angle plies located above it/them. This ensures liquid and gas tightness even if for whatever reason the primary liner 2 should fail, and thereby the hose according to the invention is able to convey high-pressure gaseous media with increased safety compared to conventional hose designs.

The hose according to the invention may optionally comprise an adhesively bonded coupling body. In case the hose is fitted with a coupling body, the secondary liner is expediently connected to the coupling body independently of the primary liner, in a manner providing gas and liquid tight sealing. A further novel feature of the hose fitted with a coupling is that the lowest small angle reinforcing ply is not bonded to the coupling in the conventional manner utilizing bonding resin, but is rather embedded in rubber. This solution may obviously be applied in case more than one lower small angle reinforcing plies are included. This embodiment is based on the recognition that the lower small angle reinforcing ply or plies only marginally take part in bearing axial forces, and therefore they will not slip out from the embedding rubber even under load. This solution enables the gas and liquid tight connection of also the secondary liner to the coupling body in the hose according to the invention fitted with a coupling, without there being a need to utilize a complex coupling having multiple components.

The primary and secondary liners of the hose according to the present invention may among others be made from vulcanised rubber, preferably oil resistant rubber, such as nitrile rubber (NBR), hydrogenated nitrile rubber (HNBR), chlorinated or chlorosulfonated polyethylene (CM, CSM), polychloroprene (CR), acrylic rubber (ACM) and its derivatives, fluorine rubber (FPM), fluorosilicone (FVMQ), epichlorohydrin rubber (CO, ECO), urethane rubber (AU, EU), etc. Identifiers commonly applied in rubber industry are given in parentheses. The material of the liner and secondary liner of the hose according to the present invention may be a plastic, including but not limited to various polyamides (PA), particularly PA-11 and PA-12, various semicrystalline fluoropolymer thermoplastic materials such as polyvinylidene fluoride and its copolymers (PVDF), polytetrafluoroethylene and its copolymers (PTFE, ETFE, FEP, HFP, PFA, THV), for instance the well known Du Pont Teflon™ and Tefzel™ brands, or other similar materials, and polyethylene (PE). The primary and secondary liners may also be made from thermoplastic polyolefin elastomer (TPO) or other thermoplastic elastomer (TPE) material. Abbreviations commonly used in plastic industry to identify materials are given in parentheses. The primary and secondary liners may be made from identical or different materials. Determining the thickness of the liners to be included in hoses of different size is a process well known to those skilled in the art. In hoses according to the invention the thickness of the secondary liner is at least 25% of the thickness of the primary liner, and is expediently between 25% and 100% of the thickness of the primary liner.

Without any limitation, both the primary and secondary sealing material may be vulcanised rubber, for instance one of the rubber materials listed above in relation to the primary and secondary liners, or alternatively a bi-component resin having sufficient elasticity and adhesion properties, such as polyurethane or soft epoxy resin.

The rubberized textile ply is expediently made from a textile or cord fabric that completely or almost completely retains its advantageous properties during the vulcanisation process. The material of the textile or cord fabric may for instance be polyamide 6, polyamide 66, polyester, viscose, aramid, natural fibre, etc., all of which are known to those skilled in the art. The material may have substantially identical properties measured in the direction of the weft and warp threads, or a cord fabric having a strength several times higher in the warp direction than in the weft direction, as well as fabrics with properties falling between these two extremes. Particularly the fabric applied as a textile ply below the reinforcing plies may be replaced by cord filaments wound in a helical fashion. In a preferred embodiment of the hose according to the present invention the rubberized textile located below the small angle reinforcing ply or plies is implemented as at least two layers of aramid cord fabric having low ultimate elongation and high warp direction strength, the layers being wound in alternating senses.

As it has been mentioned above, the lower reinforcing ply or plies (laid at small angles) are preferably made from a material having a high modulus of elasticity, including but not limited to solid metal, such as steel wires, steel cables, double twisted steel wire ropes, aramid threads and similar other materials.

The invention is explained in more detail referring to the accompanying drawings, where.

FIG. 1 has already been explained in detail above in the section surveying the state of the art. Let us now supplement the above explanation by noting that in conventional hoses the spirally laid reinforcing plies are disposed in alternating senses, with the angle of lay $\alpha_1$ of the lowest ply being typically higher than the so-called angle of equilibrium (35.26°), and the angle of lay of the uppermost ply being lower than the angle of equilibrium.

Figure 2:
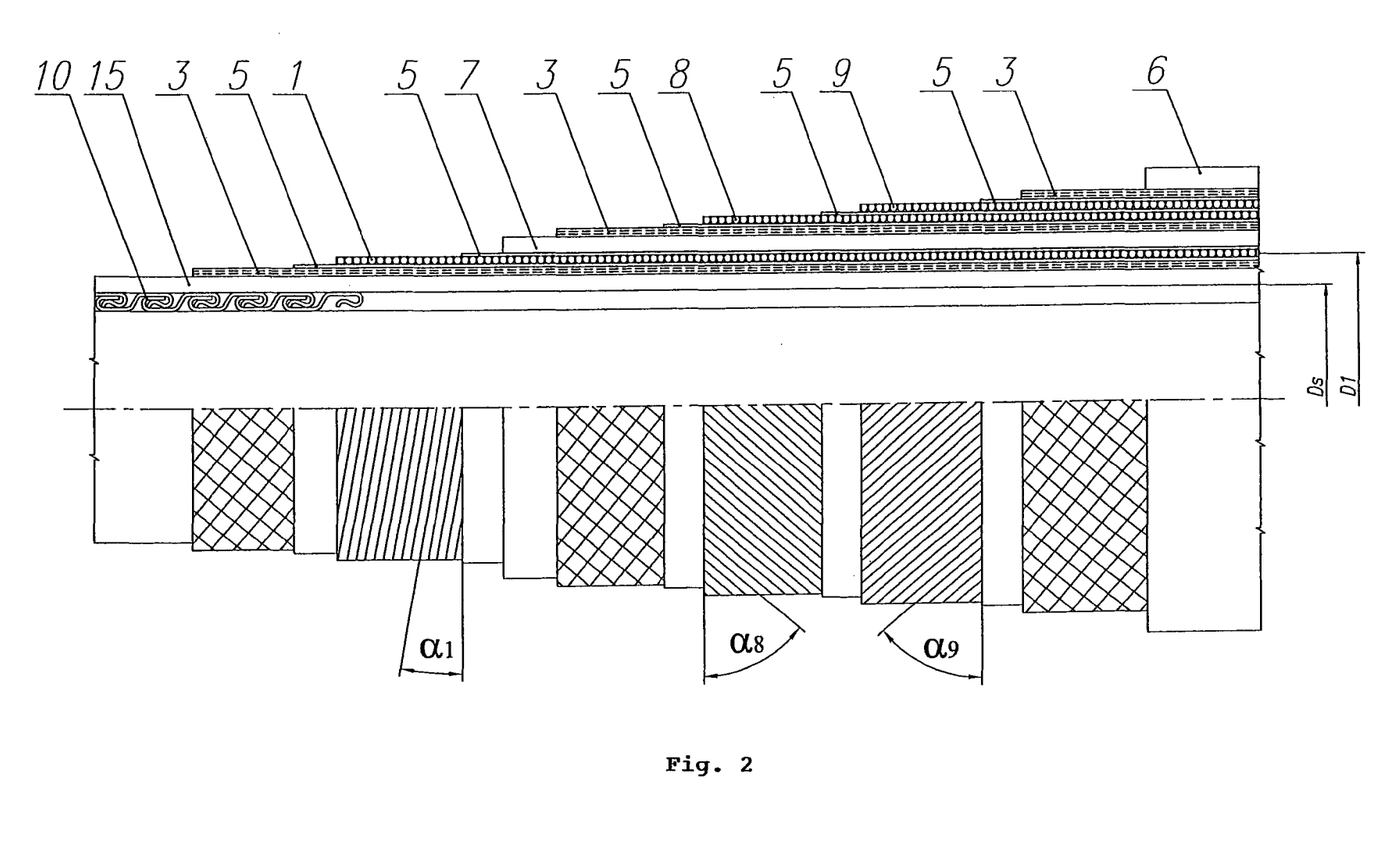
FIG. 2 shows an embodiment of the hose body according to the present invention comprising three reinforcing plies, FIG. 3. illustrates another conceivable embodiment of the hose body according to the present invention that has four reinforcing plies.

FIG. 2 shows a hose design comprising three main reinforcing plies that constitutes a preferred embodiment of the present invention. A primary liner 2, made from flexible polymer material, is disposed above the internal stripwound tube 10, the liner 2 being encompassed by a load distributing rubberized textile ply 3 (made from textile or cord fabric). The lowest small angle reinforcing ply 1, being laid at an angle of lay $\alpha_1$, is embedded in a highly adhesive embedding rubber layer 5. A secondary liner 7 is disposed above the lowest small angle reinforcing ply 1, with in specific cases another load distributing rubberized textile ply 3 being disposed above the secondary liner 7. The upper reinforcing plies 8, 9 are also embedded in embedding rubber layers 5, their angles of lay $\alpha_8$ and $\alpha_9$ being higher than the angle of equilibrium (35.26). The hose is capped by a cover 6 that is optionally reinforced by a rubberized textile ply 3.

Figure 3:
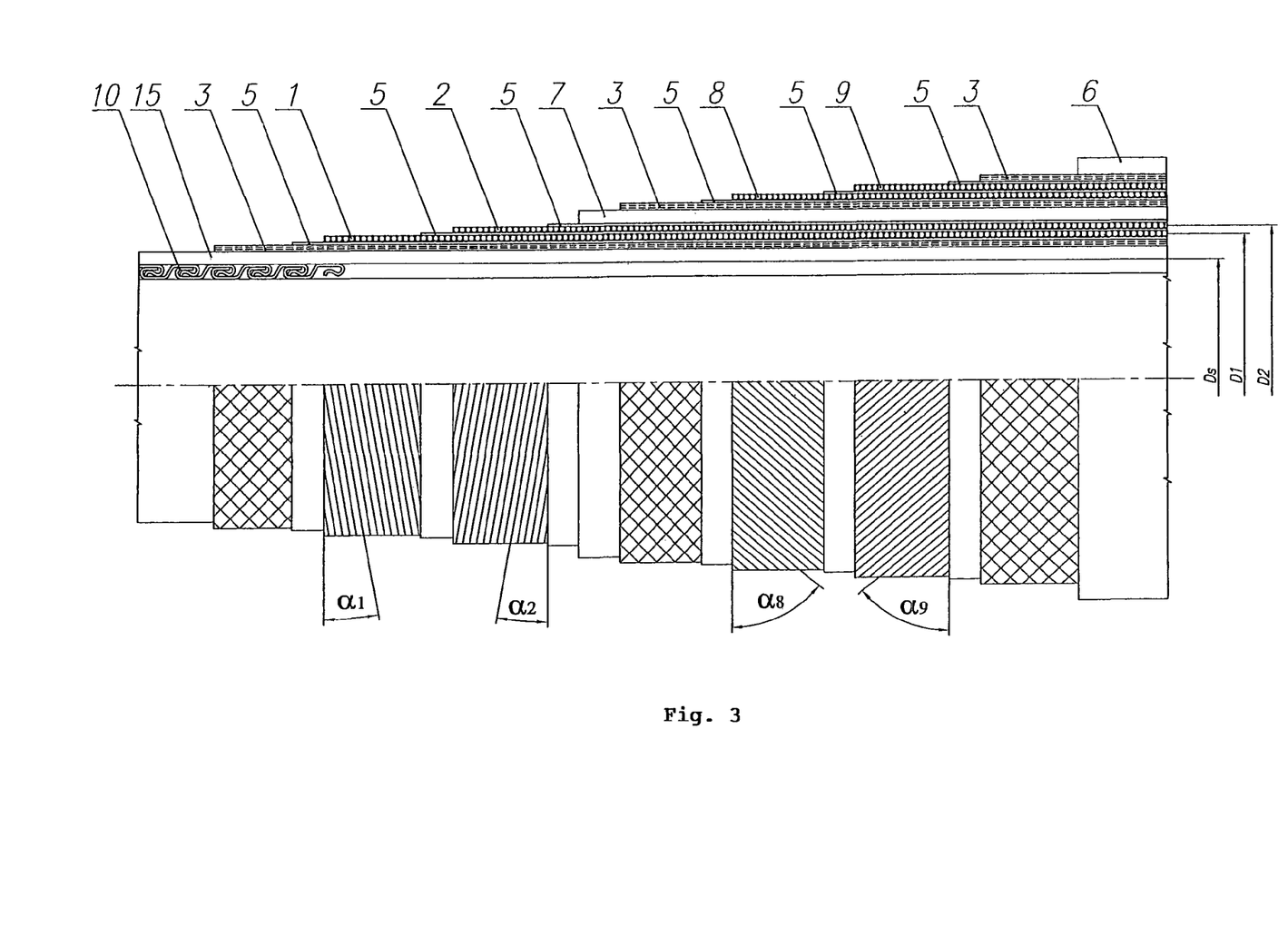

FIG. 3 shows a preferred embodiment of the hose according to the invention that comprises four main reinforcing plies. A primary liner 2, made from flexible polymer material, is disposed above the internal stripwound tube 10, the liner 2 being encompassed by a load distributing rubberized textile ply 3 (made from textile or cord fabric). The lowest small angle reinforcing ply 1, being laid at an angle of lay $\alpha_1$, as well as the second lowest small angle reinforcing ply 1a, being laid at an angle of lay $\alpha_{1a}$, are embedded in highly adhesive embedding rubber layers 5, the small angle reinforcing plies 1, 1a being laid in opposite senses. A secondary liner 7 is disposed above the lowest small angle reinforcing ply 1, with in specific cases another load distributing rubberized textile ply 3 being disposed above the secondary liner 7. The upper reinforcing plies 8, 9 are also embedded in embedding rubber layers 5, their angles of lay $\alpha_8$ and $\alpha_9$, being higher than the angle of equilibrium (35.26). The hose is capped by a cover 6 that is optionally reinforced by a rubberized textile ply 3.

Figure 4:
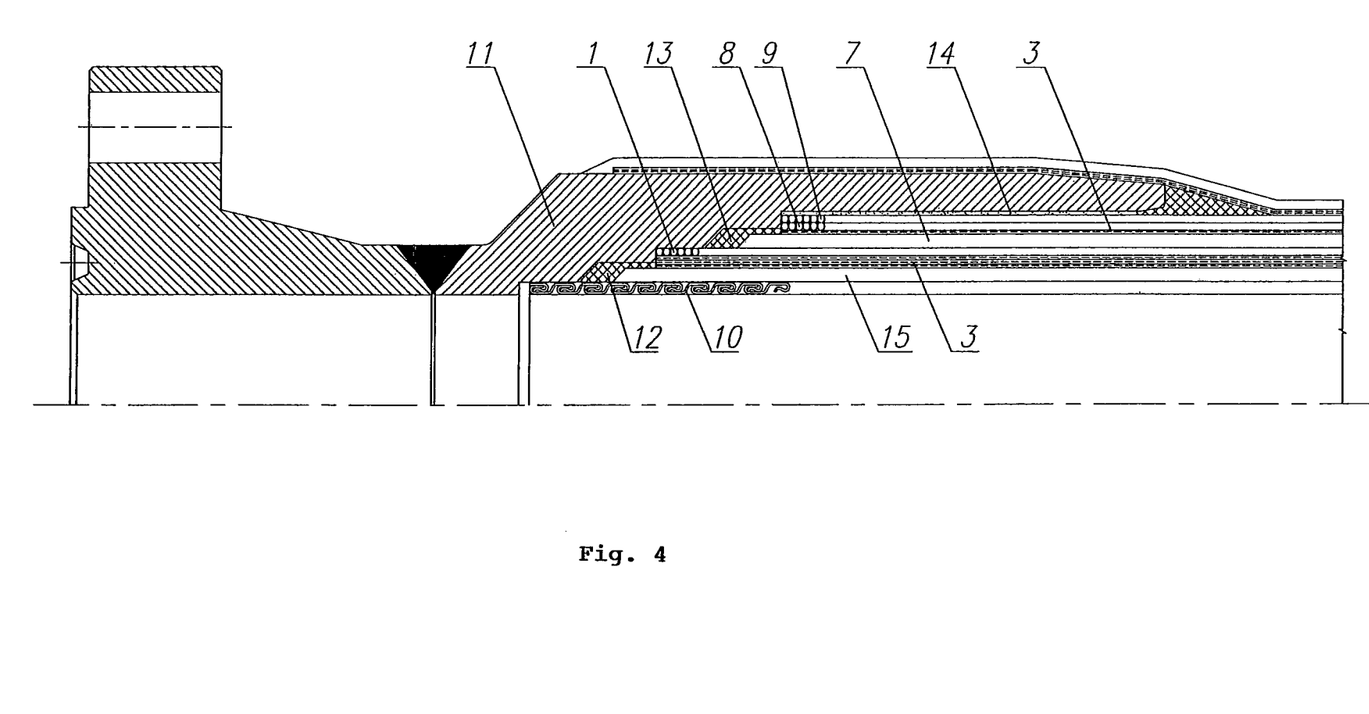
FIG. 4 illustrates a possible solution for joining a hose coupling to the hose according to the invention.

FIG. 4 schematically illustrates a possible way of joining a coupling to the hose. The internal stripwound tube 10, the primary liner 2, as well as all the other parts of the hose body are incorporated below the coupling body 11 except for the cover 6, the rubberized textile plies 3 disposed inside the cover 6, and the embedding rubber layers 5 of the upper reinforcing plies 8, 9. Gas and liquid tight sealing between the liner and the coupling is provided by a primary sealing material 12 that adheres both to the primary liner 2 and to the coupling body 11. Rubberized textile plies 3 are disposed above the primary liner 2, encompassed by the lowest small angle reinforcing ply 1 that is embedded in an embedding rubber layer 5 also in the region located under the coupling. The gas and liquid tight connection between the secondary liner 7 and the coupling body 11 is provided by a secondary sealing material 13 that adheres both to the secondary liner 7 and to the coupling body 11. A further load distribution rubberized textile ply 3 is disposed above the secondary liner 7. In a manner known in the art, the upper reinforcing plies 8, 9 are bonded to the coupling body 11 utilizing bonding resin 14, the reinforcing plies 8, 9 being thereby encompassed by the bonding resin 14, rather than the embedding rubber layer 5, inside the coupling body 11.

To allow better comprehension of our solution, the invention is illustrated below through practical examples.

EXAMPLES

Example 1

A hose for conveying live crude oil, having three helically laid reinforcing plies made from steel cable (in other words steel cord).

The inner diameter of the hose is 101.6 mm (4") and its operating pressure is P=34.5 MPa (5000 psi). The outside diameter of the internal stripwound tube 10 is $D_s$=115 mm, with a primary liner 2 made from 6 mm thick oilp resistant rubber being located above it. Each of the load distributing rubberized textile plies 3 comprise a layer of quadratic PA66 breaker fabric, and two layers of aramid cord fabric laid in opposite senses. The angle of lay of the cord fabric layers is approximately 45°. The lowest small angle reinforcing ply 1 is made from 3.5 mm diameter brass plated steel cable that requires a force of $F_1$=1300 N to undergo an elastic strain of 0.1%. The mean diameter $D_1$ of the lowest small angle reinforcing ply 1 is 145 mm, the number of filaments being $n_1$=5, and the angle of lay $\alpha_1$=2.5°. A secondary liner 7, made from 3-mm thick oil resistant rubber, is located above the lowest small angle reinforcing ply 1, together with two rubber-embedded upper reinforcing plies 8, 9 that are also made from 3.5-mm diameter brass plated steel cable, each ply consisting of 85 filaments, the plies being laid at respective angles of lay of $\alpha_8$=43 and $\alpha_9$=40°. Since the value $tg^2\alpha_1$=0.0019 on the left side of inequality (1) is considerably less than the value 0.1855 standing on the right, inequality (1) holds. Inequalities (3), (4), (5) have a value of 3.70 on their left side, which is less than 5 and therefore all three inequalities will hold. The hose is fitted with a coupling body 11 similar to what has been described in relation to FIG. 4, wherein the primary liner 2 is bonded to the coupling body 11 applying a primary sealing material 12. Vulcanised adhesion between the primary sealing material 12 and the coupling body ills provided by an adhesion enhancer marketed under the trade name Chemosil™. Likewise, the secondary liner 7 is bonded to the coupling body 11 utilizing a secondary sealing material 13. The primary sealing material 12 is different from the material of the primary liner 2, while the secondary sealing material 13 is identical to the material of the secondary liner 7. Inside the coupling body 11 the lowest small angle reinforcing ply 1 is embedded in rubber, with the high angle upper reinforcing plies 7, 8 being bonded to the coupling body 11 applying epoxy resin.

Example 2

A hose having four helically laid reinforcing plies made from steel cable.

The inner diameter of the hose is 150 mm (6") and its operating pressure is P=51.7 MPa (7500 psi). The outside diameter of the internal stripwound tube 10 is $D_s$=165 mm, with a primary liner 2 made from 7-mm thick extruded polyvinylidene fluoride (PVDF) being located above it. The load distributing textile ply 3 has two layers of aramid cord fabric laid in opposite senses. The angle of lay of the cord fabric layers is approximately 45°. The hose comprises a lowest small angle reinforcing ply 1 and a second lowest small angle reinforcing ply 1a, which are laid in opposite senses and are made from 6-mm diameter zinc coated steel cable that requires a force of F=3400 N to undergo an elastic strain of 0.1%. The mean diameter $D_1$ of the lowest small angle reinforcing ply 1 is 200 mm, the number of filaments being $n_1$=30, and the angle of lay $\alpha_1$=18°. The mean diameter $D_{1a}$ of the second lowest small angle reinforcing ply 1a is 220 mm, the number of filaments being $n_{1a}$=47, and the angle of lay $\alpha_{1a}$=25°. A secondary liner 7, made from 2.5-mm thick oil resistant rubber, is located above the lowest and second lowest small angle reinforcing plies 1, 1a, together with a rubberized textile ply consisting of two layers of quadratic PA66 fabric, and two rubber-embedded upper reinforcing plies 8, 9 that are also made from 6-mm diameter zinc coated steel wire, each ply consisting of 75 filaments, the plies being laid at respective angles of lay of $\alpha_8$=40 and $\alpha_9$=38°. Since the value $tg^2\alpha_1$=0.1056 on the left side of inequality (1) is less than the value 0.1597 standing on the right, inequality (1) will hold. Inquality (2) will also hold because $tg^2\alpha_{1a}$=0.2174 (computed for the second lowest small angle reinforcing ply 1a) is less than 0.2188, the value on the right. Inequalities (6), (7), (8) have a value of 4.97 on their left side, which is less than 5 and therefore all three inequalities hold.

Example 3

A hose reinforced with solid steel wires and cables.

The inner diameter of the hose is 250 mm (10") and its operating pressure is P=20.7 MPa (3000 psi). The outside diameter of the internal stripwound tube 10 is $D_s$=270 mm, with a primary liner 2 made from 10 mm thick oil resistant rubber being located above it. The load distributing rubberized textile ply 3 has five layers of polyamide 66 quadratic mesh fabric laid in opposite senses. The angle of lay of the cord fabric layers is approximately 40°. The hose comprises a lowest small angle reinforcing ply 1 and a second lowest small angle reinforcing ply 1a, which are laid in identical sense and are made from 4-mm diameter brass plated solid steel wire that requires a force of F=2500 N to undergo an elastic strain of 0.1%. The mean diameter $D_1$ of the lowest small angle reinforcing ply 1 is 315 mm, the number of filaments being $n_1$=10, and the angle of lay $\alpha_1$=3°. The mean diameter $D_{1a}$ of the second lowest small angle reinforcing ply 1a is 325 mm, the number of filaments being $n_{1a}$=10, and the angle of lay $\alpha_{1a}$=2.9°. A secondary liner 7, made from 4-mm thick oil resistant rubber, is located above the lowest and second lowest small angle reinforcing plies 1, 1a, together with three layers of quadratic PA66 rubberized textile ply consisting of mesh fabric, and two rubber-embedded upper reinforcing plies 8, 9 that are made from 4.5-mm diameter zinc coated steel cable, each ply consisting of 170 filaments, the plies being laid at respective angles of lay of $\alpha_8$=48 and $\alpha_9$=46°. Since the value $tg^2\alpha_1$=0.0027 on the left side of inequality (1) is less than the value 0.1327 standing on the right, inequality (1) will hold. Inquality (2) will also hold because $tg^2\alpha_{1a}$=0.026 (computed for the second lowest small angle reinforcing ply 1a) is also significantly less than 0.1549, the value on the right. Inequalities (6), (7), (8) have a value of 4.39 on their left side, which is less than 5 and therefore all three inequalities hold.

Example 4

A hose comprising two braided reinforcing plies.

The inner diameter of the hose is 38 mm (1.5") and its operating pressure is P=15 MPa (2200 psi). The outside diameter of the internal stripwound tube 10 is $D_s$=48 mm, with a primary liner 2 extruded from 3-mm thick oil resistant rubber being located above it. Adhesion between the liner and the braided ply is provided by 1-mm thick embedding material 5. The braided lowest small angle reinforcing ply 1 is made from 0.9-mm diameter aramid cords treated with RFL adhesion enhancer. Each cord filament requires a force $F_1$=20 N to undergo an elastic strain of 0.1%. The mean diameter $D_1$ of the lowest small angle reinforcing ply 1 is 58 mm, the ply consisting of 16 strands in both directions, each strand containing 4 filaments, and thus the ply has $n_1$=128 filaments in total. The angle of lay is $\alpha_1$=20°. A 2-mm thick secondary liner 7, made from rubber, is located above the circular woven lowest small angle reinforcing ply 1, with a further higher-angle circular woven upper reinforcing ply 8 being also disposed above reinforcing ply 1, having a mean diameter of 68 mm and being made from aramid cords of the same type as small angle reinforcing ply 1 and also consisting from 16 strands per direction, each strand containing 7 filaments, with an angle of lay of 40°. Both circular woven plies are encompassed by embedding material 5 containing adhesion enhancer. Since the value $tg^2\alpha_1$=0.1325 on the left side of inequality (1) is less than the value 0.1576 standing on the right, inequality (1) will hold. Inequalities (3), (4), (5) have a value of 6.54 on their left side, which is less than 10 but greater than 5, and therefore inequalities (3) and (4) will hold but inequality (5) will not hold.

The invention claimed is:

1. A bonded high-pressure rubber hose comprising a flexible internal stripwound tube, a liquid and gas tight primary liner made from rubber or plastic, reinforcing plies embedded in rubber, one or more of the reinforcing plies comprising lower reinforcing plies which are disposed at an angle of lay smaller than an angle of equilibrium, the reinforcing plies further comprising upper reinforcing plies disposed at a higher angle of lay than the angle of equilibrium, a liquid and gas tight secondary liner disposed above the lower reinforcing plies, and an adhesively bonded coupling, wherein if the primary liner should become damaged the secondary liner and the upper reinforcing plies can still withstand at least a design operating internal pressure of the hose, wherein the one or more lower reinforcing plies are embedded in rubber inside of a body of the coupling and the secondary liner is adhesively bonded to the body of the coupling by a sealing material that provides metal to rubber adhesion, and wherein the following inequality holds for the angle of lay of a lowest one of the one or more lower reinforcing plies of the hose:

$$tg^2\alpha_1 < [1-(D_s/D_1)^2]/2$$

where $\alpha_1$ is the angle of lay of the lowest one of the one or more lower reinforcing plies, $D_s$ is the outside diameter of the internal stripwound tube, $D_1$ is the mean diameter of the lowest one of the one or more lower reinforcing ply plies.

2. The hose according to claim 1, wherein the one or more lower reinforcing plies comprises more than one lower reinforcing plies, and the following inequality holds for the angle of lay of each of the lower reinforcing plies thereof:

$$tg^2\alpha_i < [1-(D_s/D_i)^2]/2$$

where $\alpha_i$ is the angle of lay of the i-th lower reinforcing ply, $D_s$ is the outside diameter of the internal stripwound tube, and $D_i$ is the mean diameter of the i-th lower reinforcing ply.

3. The hose according to claim 1, wherein the following inequality holds for the lowest one of the one or more lower reinforcing plies or the one or more lower reinforcing plies thereof:

$$P\Sigma(D_i^3 \Pi tg\alpha_i)]/\Sigma[20n_i F_i(D_t-D_s)]<25$$

where

P is the design pressure of the hose, $n_i$ is the number of filaments of the i-th lowest one of the one or more lower reinforcing plies, $F_i$ is the force required for an elastic strain of 0.1% if only a single reinforcing ply filament in the i-th ply.

4. The hose according to claim 3, wherein the following inequality holds for the one or more lower reinforcing plies thereof:

$$P\Sigma(D_i^3 \Pi tg\alpha_i)]/\Sigma[20n_i F_i(D_t-D_s)]<10.$$

5. The hose according to claim 4, wherein the following inequality holds for the one or more lower reinforcing plies thereof:

$$P\Sigma(D_i^3 \Pi tg\alpha_i)]/\Sigma[20n_i F_i(D_t-D_s)]<5.$$

6. The hose according to claim 1, wherein the thickness of the secondary liner is at least 25% of the thickness of the primary liner.

7. The hose according to claim 1, wherein the thickness of the secondary liner is between 25% and 100% of the thickness of the primary liner.

8. The hose according to claim 1, wherein the hose further comprises at least two layers of load distribution aramid cord fabric forming a rubberized textile ply disposed under the lowest one of the one or more lower reinforcing plies or the one or more lower reinforcing plies thereof.

9. The hose according to claim 8, wherein the aramid cord fabric layers are laid in alternating senses.

10. The hose according to claim 1, wherein the upper reinforcing plies are bonded by resin to the coupling body.

* * * * *